United States Patent [19]
Thomas, Jr. et al.

[11] Patent Number: 6,004,604
[45] Date of Patent: Dec. 21, 1999

[54] METHOD OF TREATING PRODUCE

[75] Inventors: Iverson Thomas, Jr., Yakima; Prindle Joyce, Olympia; Keith E. Robert, Puyallup, all of Wash.

[73] Assignee: CH20 Incorporated, Olympia, Wash.

[21] Appl. No.: 09/190,996

[22] Filed: Nov. 12, 1998

Related U.S. Application Data

[62] Division of application No. 08/894,186, Aug. 14, 1997, Pat. No. 5,863,584.

[51] Int. Cl.$^6$ ..................................................... A23L 3/358
[52] U.S. Cl. ........................... 426/326; 426/335; 426/615; 99/516; 99/524; 99/536
[58] Field of Search ..................................... 426/326, 335, 426/615; 99/516, 524, 536

[56] References Cited

U.S. PATENT DOCUMENTS

| | | | |
|---|---|---|---|
| 3,814,820 | 6/1974 | Busta et al. | 426/335 |
| 4,021,585 | 5/1977 | Suobuda et al. | 426/332 |
| 5,451,266 | 9/1995 | Kirk et al. | 426/335 |
| 5,863,584 | 1/1999 | Thomas et al. | 426/335 |

*Primary Examiner*—Helen Pratt
*Attorney, Agent, or Firm*—Delbert J. Barnard

[57] ABSTRACT

A chlorine dioxide solution is sprayed onto produce that includes at least one contaminant which can be debris, soil, fungus and/or organic chemicals. Sprayers are used to spray the chloride dioxide solution on the produce to wash the contaminant from the produce. The produce may be placed on a conveyor and the conveyor may be used to move the produce under the sprayers while the sprayers are used to spray chlorine dioxide solution onto the produce. The conveyor may include rotating brushes that come in contact with the produce, such that the brushes that brush the produce and mechanically remove debris and residue from the produce. Rinsing sprayers may be provided over the conveying path downstream of the sprayer that sprays the chlorine dioxide solution on the produce. The rinsing sprayers may be used to spray the produce with potable rinse water.

5 Claims, 3 Drawing Sheets

# METHOD OF TREATING PRODUCE

CROSS REFERENCE TO RELATED APPLICATION

This application is a division of Ser. No. 08/894,186, filed Aug. 14, 1997 now U.S. Pat. No. 5,863,584 and entitled Method For Treating Produce And Process Water.

TECHNICAL FIELD

This invention relates to a method for treating produce to remove debris, organic chemicals, and hard water deposits from the produce and inhibit the formation of mold on the produce, and more particularly, to a method of cleaning, sanitizing, and descaling produce by the use of an effective amount of a chlorine dioxide. solution.

BACKGROUND INFORMATION

After harvest, fresh produce is washed before being sorted and packed. Once clean produce has been sorted and packed, fungus adhering to the surface of the produce may cause mold to develop before the produce has reached market. The presence of fungus on even one piece of produce in a crate can cause decay of substantially all of the produce in the crate. For these reasons, it is desirable to reduce the occurrence of decay in packed produce so that the overall value of the harvested produce is increased.

If produce is treated by process water, the used process water contains contaminants and debris. Conventionally, process water for treating produce has been used for a short time before being dumped due to the buildup of contaminants in the process water.

DISCLOSURE OF THE INVENTION

The present invention provides a method for treating process water and an object submerged in process water when the process water and the object include at least one contaminant from the group of debris, soil, fungus, and organic chemicals.

The method comprises passing the produce under a flow of a chlorine dioxide solution to wash debris from the produce. The chlorine dioxide solution may be generated by the reaction of a solution comprising sodium chlorite with a solution comprising phosphoric acid, sodium 2-ethylhexyl sulfate, and either dodecylbenzenesulfonic acid or sodium dodecylbenzene sulfonate. Alternatively, the chlorine dioxide solution may be generated by the reaction of a solution comprising sodium chlorite and sodium chloride with a solution comprising phosphoric acid, sodium 2-ethylhexyl sulfate, and either dodecylbenzenesulfonic acid or sodium dodecylbenzene sulfonate.

A chlorine dioxide solution may be delivered to sprayers and the sprayers and may be used to spray the chlorine dioxide solution on the produce to wash contaminants from the produce. The produce may be placed onto a conveyor and the conveyor may be used to move the produce under the sprayers. During movement, the sprayers may be used to spray chlorine dioxide solution onto the produce. Rotating brushes may be provided and the produce may be placed in contact with the rotating brushes, so that the brushes will brush the produce and mechanically remove debris and residue from the produce. A plurality of rinsing sprayers may be positioned over the conveying path of the conveyor downstream of the sprayers that spray the chlorine dioxide solution. The rinsing sprayers may be used to spray the produce with potable rinse water.

These and other advantages and features will become apparent from the detailed description of the best mode for carrying out the invention that follows.

BRIEF DESCRIPTION OF THE DRAWINGS

In the drawings, like element designations refer to like parts throughout the several views, and.

BEST MODE FOR CARRYING OUT THE INVENTION

Figure 1:
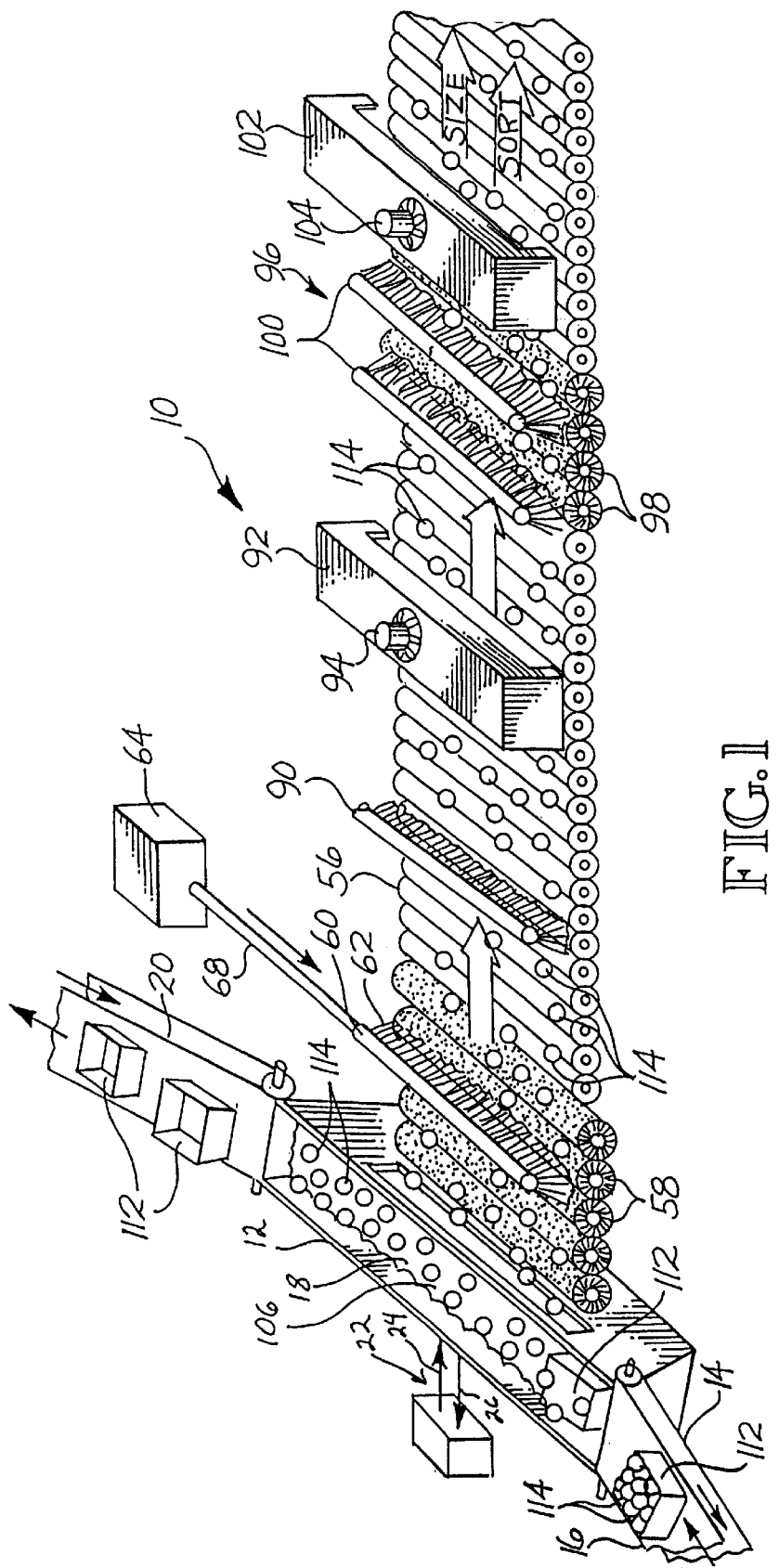
FIG. 1 is schematic view of produce cleaning assembly line used in the method of the present invention.
Figure 2:
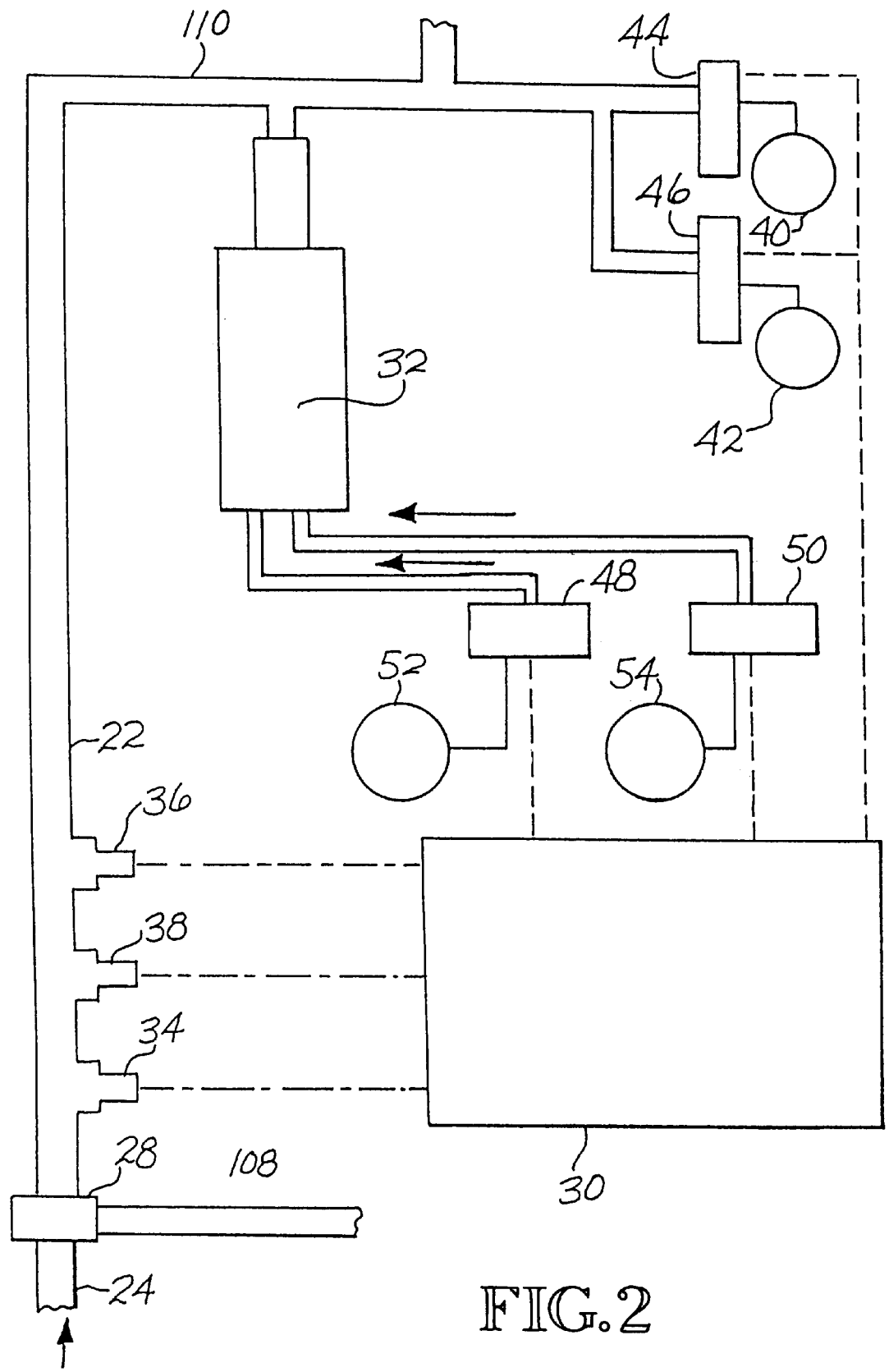
FIG. 2 is a fragmentary schematic view of the chlorine dioxide generator and controller shown in FIG. 1.

Referring to FIGS. 1 and 2, a produce washing assembly line 10 is shown. The assembly line 10 includes a dump tank 12 and a bin conveyor 14 which has an entrance side 16, a tank portion 18, and an exit side 20. A process water control loop 22 extends off of the dump tank 12. The process water control loop 22 has an inlet 24 from the dump tank 12 into the loop 22 and an outlet 26 from the loop 22 into the dump tank 12. A filter 28 is positioned on the inlet 24 of the control loop 22. Process water from the dump tank 12 is pumped through the loop 22 so that the composition of the process water can be monitored and maintained.

A process water controller 30 and a chlorine dioxide reactor 32 are attached. to the control loop 22. The process water controller 30 includes an Oxidation Reduction Potential (ORP) probe 34 which senses the ORP residual in the process water passing through the control loop 22. The controller 30 also includes a flow indicator 36 which indicates to the controller 30 that process water is flowing through the loop 22. When the flow indicator 36 indicates that process water is flowing through the loop 22, the controller 30 enables the ORP probe 34 to measure the ORP residual in the process water. If the ORP probe 34 indicates that the ORP residual in the process water is too low, the controller 30 activates the chlorine dioxide reactor 32 to generate chlorine dioxide solution.

A pH probe 38 monitors the pH of the process water. Storage tanks 40, 42 of pH adjusting agents are attached to pumps 44, 46 which are controlled by controller 30. Storage tank 40 stores a pH reducing agent. Storage tank 42 stores a pH boosting agent. The controller 30 is operable for feeding pH adjusting agents into the process water.

The controller 30 controls a first pump 48 and a second pump 50 which are attached to a first storage tank 52 and a second storage tank 54, respectively. The pumps 48, 50 are operable for pumping solutions from the storage tanks 52, 54 to the reactor 32. The controller 30 activates pumping of proportional amounts of solutions from each of the tanks 52, 54.

Figure 3:
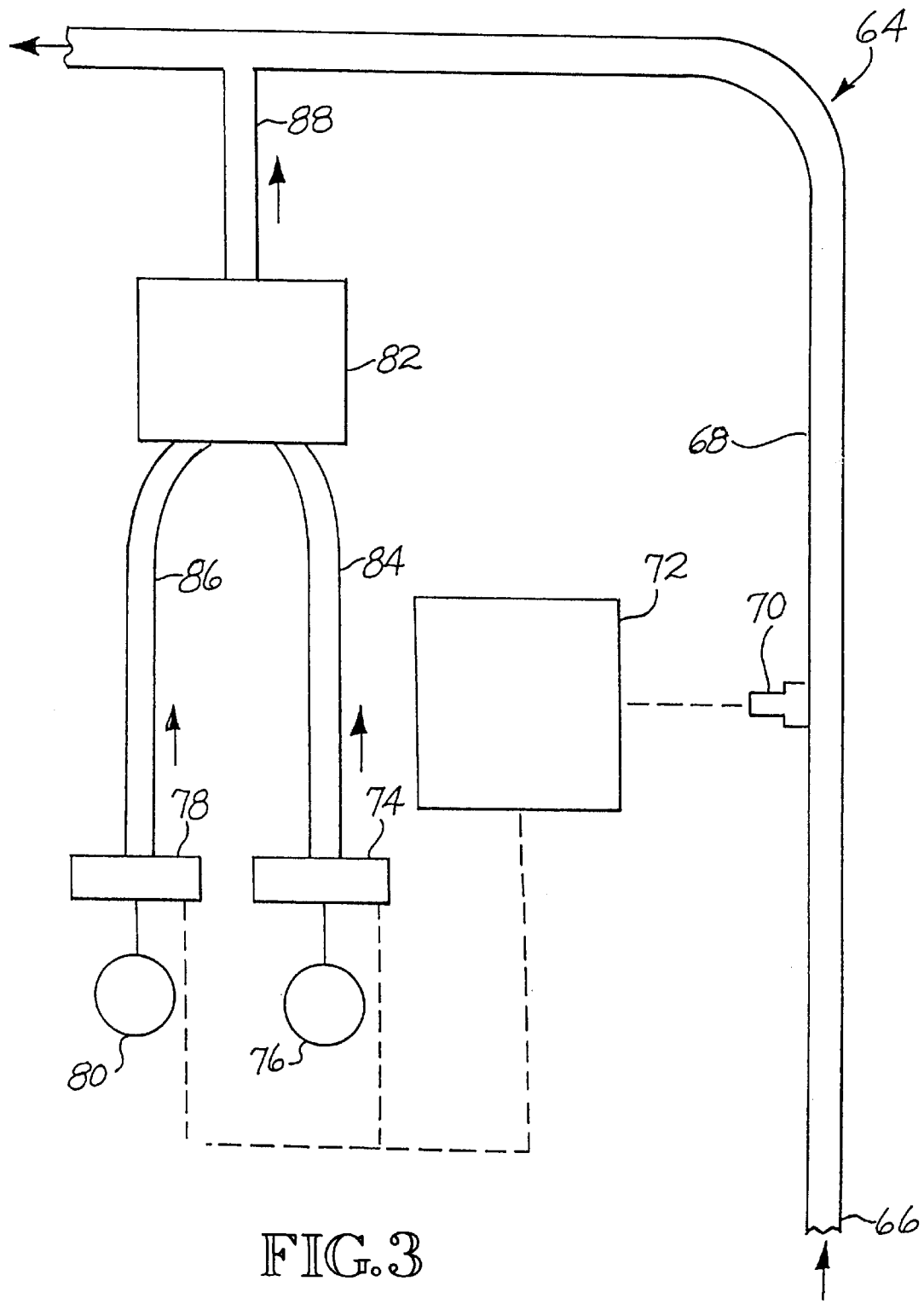
FIG. 3 is a fragmentary schematic view of another chlorine dioxide generator and controller shown in FIG. 1.

An apple conveyor 56 extends into the dump tank 12. The apple conveyor 56 is operable for moving apples out of the dump tank 12 and through a series of stations before the apples are sorted, sized and packed. The first station along the apple conveyor 56 includes a plurality of rotating brushes 58 and a spray bar 60. The spray bar 60 is operable for emitting a flow of a second chlorine dioxide solution 62 onto apples. The chlorine dioxide solution 62 is monitored and produced by a chlorine dioxide generation system 64, shown in more detail in FIG. 3.

The chlorine dioxide generation system 64 includes an inlet 66 which is operable for feeding potable water through conduit 68 past flow meter 70. The flow meter 70 is operable for transmitting flow rate information to controller 72. Controller 72 is operable for signalling a first pump 74 to pump a solution from a first storage tank 76 and a second pump 78 to pump a solution from a second storage tank 80. The first and second pumps 74, 78 are operable for pumping solutions to reactor 82 through feed lines 84 and 86. The chlorine dioxide solution from the reactor 82 are fed through line 88 and into conduit 68 which feeds into the spray bar 60.

Further down the apple conveyor 56 from the spray bar 60 is a rinsing sprayer 90. The rinsing sprayer 90 is operable for rinsing apples with potable water. The next station along the apple conveyor 56 is a drying station 92. The drying station 92 includes a fan 94 for blowing ambient temperature air over apples on the conveyor 56. Following the drying station 92 is a waxing station 96 which includes a plurality of rotating brushes 98 and an overhead spraying mechanisms 100 which are operable for spraying wax on the surface of apples. After the waxing station 96 is a final drying station 102 which includes a fan 104 which is operable for blowing heated air on apples on the conveyor 56.

In a preferred form of the invention, the produce washing assembly line 10 is operated in the following manner. The dump tank 12 is filled with approximately 3,000 gallons of process water 106. The process water 106 is monitored by pumping the process water 106 through the control loop 22. As process water 106 enters the inlet 24 of the control loop 22, the process water 106 passes through the filter 28. The filter 28 separates particulate matter, such as leaves, twigs, and other orchard debris, from the process water 106. In a preferred form of the invention, the control loop 22 includes a differential switch (not shown) installed on the filter 28 for measuring the accumulation of particulate matter on the filter 28. When a predetermined level of particulate matter has accumulated on the filter 28, the differential switch activates an automatic backwash (not shown) which washes the particulate matter out of the system through conduit 108.

The process water 106 is admixed with between about 0.1 and about 10 ppm chlorine dioxide solution from the reactor 32. In a more preferred form of the invent the the process water 106 is admixed with between about 0.5 and about 1.0 ppm chlorine dioxide solution. In an even more preferred form of the invention, the process water 106 is admixed with about 1.0 ppm chlorine dioxide solution.

Preferably, the process water 106 admixed with the chlorine dioxide solution has a pH of less than 11, and in a more preferred form of the invention, a pH of between about 2 and about 10.5, and more commonly, between about 3 and about 10. If the apples being cleaned in the assembly line 10 are heavily scaled, i.e. covered in hard water deposits, the pH of the process water 106 admixed with the chlorine dioxide solution is maintained well below 7, and preferably at about 3. If the apples are not scaled, but instead are covered mainly in debris, such as orchard soil, the pH of the process water 106 admixed with the chlorine dioxide solution is maintained at between about 7 and about 10. Accordingly, the preferred pH of the process water 106 admixed with the chlorine dioxide solution depends on the type of debris present on the apples 114 and in the process water 106.

The chlorine dioxide solution is generated by reacting one part of a First Solution fed by the first pump 48 from tank 52 with between one and five parts of a Second Solution fed by the second pump 50 from tank 54. In a preferred form of the invention, one part of the First Solution is reacted with two parts of the Second Solution. The First Solution comprises an active ingredient of sodium chlorite. In a more preferred form of the invention, the First Solution comprises 9.4% of 80% technical sodium chlorite and the balance water. In another form of the invention, the First Solution comprises 9.4% of 80% technical sodium chlorite, 15% sodium chloride and the balance water.

The Second Solution comprises phosphoric acid as an active ingredient. It is preferable to include an anionic surfactant and coupling agent, such as sodium 2-ethylhexyl sulfate in the Second Solution. In a more preferred form of the invention, the Second Solution comprises 1% sodium 2-ethylhexyl sulfate, 7.5% phosphoric acid and the balance water.

The First Solution and the Second Solution are fed into the reactor 32 by pumps 48, 50. In the reactor 32, the First Solution and Second Solution are allowed a contact time of at least about 15 minutes. When the controller 30 determines that more chlorine dioxide solution is needed in the process water 106 due to the reading of the ORP probe 34, the controller 30 activates the pumps 48, 50 to feed more of the First and Second Solution to the reactor 32. As the First and Second Solutions enter the reactor 32, the chlorine dioxide solution in the reactor 32 is displaced from the reactor 32 into conduit 110 which empties into the loop 22 and into the dump tank 12.

Substantial foaming of the chlorine dioxide solution is undesirable since foam could be detrimental to the pumps 48, 50 on the control loop 22. Accordingly, it is preferred that the First Solution and the Second Solution include surfactants which produce little to no foam.

The controller 30 monitors and controls the composition of the process water 106 in the following manner. The desired ORP level is set on the controller 30. The ORP level is indicative of a particular chlorine dioxide residual in the process water 106. The pH of the process water 106 is monitored by the pH probe 38.

As process water 106 flows through loop 22, the pH probe 38 monitors the pH of the process water 106. If the pH in the process water 106 is too high, the second pump 50 is activated to pump a higher proportion of the Second Solution from storage tank 54 to the reactor 32. Generally, the second pump 50 is manually calibrated to pump a higher proportion of the Second Solution for pH control, although it is foreseeable that this calibration of the second pump 50 could be automated. The amount of the Second Solution can be increased until the 5 parts of the Second Solution are being fed for each 1 part of the First Solution. Generally, it is undesirable to feed the Second Solution at a rate higher than 5 parts for each 1 part of First Solution since proper reactions may not take place in the reactor 32.

If a lower pH is desired, an effective amount of a pH reducing agent may be added to the process water 106. The controller 30 activates pump 44 to pump pH reducing agent from storage tank 40 to feed through conduit 110 and into the process water 106. In a preferred form of the invention, the pH reducing agent comprises phosphoric acid as an active agent. Sodium 2-ethylhexyl sulfate may be present in the pH reducing agent to provide an increase in surface activity. In a more preferred form of the invention, the pH reducing agent comprises 26.25% phosphoric acid, 1.4% sodium 2-ethylhexyl sulfate and the balance water.

If the pH of the process water 106 is too low, the controller 30 activates pump 46 to pump pH boosting agent from storage tank 42 into feed to the process water 106. Preferably, the pH boosting agent comprises sodium hydroxide. A chelant, such as sodium gluconate, may be part of the boosting agent to aid in cleaning mineral type debris. In a more preferred form of the invention, the pH boosting agent comprises 42.5% sodium hydroxide, 17.5% sodium gluconate, and the balance water.

Bins 112 of freshly-harvested apples 114 are placed on the entrance side 16 of the bin conveyor 14. The apples 114 may have contaminants such as debris, orchard soil, fungus, organic chemicals such as agricultural chemicals, and hard water scale on their surfaces. As the bins 112 move into the tank portion 18 of the conveyor 14, the bins 112 become submerged in process water 106 in the dump tank 12. The apples 114 float out of the bins 112 into the process water 106 in the dump tank 12. While the apples 114 are in the dump tank 12, the apples 114 are cleaned, descaled, and sanitized by contact with the process water 106 which has admixed with it the chlorine dioxide solution. As the apples 114 float toward the surface of the dump tank 12, a water current (not shown) pushes the apples 114 toward the apple conveyor 56. Preferably, the apples 114 remain in the dump tank 12 for at least 30 seconds before being pushed onto the conveyor 56. An estimated 75–85% of the cleaning, descaling, and sanitizing of the apples 114 is accomplished by the process water 106 comprising the chlorine dioxide solution in the dump tank 12.

Along with the apples 114 being cleaned, descaled and sanitized by the process water 106 in the dump tank 12, the bins 112 are cleaned and sanitized. As the apples 114 float to the surface of the dump tank 12, the bins 112 continue along the bin conveyor 14 and out the exit side 20 of the conveyor 14 for re-use.

An additional benefit of the present invention is the treatment of the process water 106. Just as the chlorine dioxide solution treats the apples 114 and the bins 112, organic chemicals and contaminants in the process water 106 are treated by the chlorine dioxide solution. Without the use of the chlorine dioxide solution in the process water in the dump tank, the process water became brown, had an unpleasant odor, and was full of sludge after apples had been washed in the system for a few days. With the addition of the chlorine dioxide solution to the process water 106, the process water 106 remains clear and odorless, even after weeks of treating apples in the system.

As the apples 114 proceed down the apple conveyor 56, the apples 114 roll on top of the rotating brushes 58 and pass underneath the spray bar 60. The spray bar 60 emits a second chlorine dioxide solution 62 onto the apples 114. The second chlorine dioxide solution 62 is generated by the generation system 64 illustrated in FIG. 3. The generation system 64 is operated by feeding potable water through the inlet 66 of conduit 68. The flow of potable water is monitored by flow meter 70. The readings from flow meter 70 are transmitted to controller 72. The controller 72 signals pumps 74, 78 to pump solutions from storage tanks 76, 80. The solutions are fed to the reactor 82 and then into the potable water in conduit 68 to create the chlorine dioxide solution 62. Storage tank 76 stores the First Solution, as described above. Storage tank 80 stores a Third Solution.

The controller 72 activates pumps 74, 78 to pump First Solution and Third Solution from tanks 76, 80, respectively, through feed lines 84, 86 and into the reactor 82. As the solutions enter the reactor 82, previously generated product is expelled from the reactor 82 into line 88 and then into conduit 68 where it mixes with the water to form the second chlorine dioxide solution 62. Preferably the solutions are allowed a contact time of at least about 15 minutes in the reactor 82.

The Third Solution comprises an anionic surfactant, such as dodecylbenzenesulfonic acid or sodium dodecylbenzene sulfonate, and an anionic surfactant coupling agent, such as sodium 2-ethylhexyl sulfate. In a preferred form of the invention, the Third Solution can be in the form of 1.6% sodium 2-ethylhexyl sulfate, 4% dodecylbenzenesulfonic acid, 7.5% phosphoric acid, and the balance water. In another form of the invention, the Third Solution comprises 3% sodium 2-ethylhexyl sulfate, 7.5% dodecylbenzenesulfonic acid, 15% phosphoric acid, and the balance water. The sodium 2-ethylhexyl sulfate provides stabilizing properties in the second chlorine dioxide solution 62 so that the solution 62 will feed through the spray bar 60 without substantial clogging.

The controller 72 controls flow rates of the First Solution and Third Solution to the reactor 82 such that the second chlorine dioxide solution 62 has a chlorine dioxide residual of between about 0.1 ppm and about 10 ppm. It is preferred that the second chlorine dioxide residual in the solution 62 is between about 1 and about 5 ppm. Although, the solution 62 is generally very effective at about 1.0 ppm.

In a preferred form of the invention, the chlorine dioxide solution 62 is generated by reacting one part of the First Solution, as described above, with between one and five parts of the Third Solution. In an even more preferred form of the invention, one part of the First Solution is reacted with 5 parts of the Third Solution.

The pH of the second chlorine dioxide solution 62 is monitored. Preferably, the pH of the solution 62 is between about 3 and about 7. In a more preferred form of the invention, the pH of the solution 62 is maintained at about 3. If the pH of the solution 62 is too high, more of the Third Solution is fed to the reactor 82. To adjust the pH, the feed rate of the Third Solution can be increased to 5 parts for each 1 part of the First Solution. Generally, it is undesirable to feed the Third Solution at rates higher than 5 parts for each one part of the First Solution, since undesired reactions may take place in the reactor 82.

The second chlorine dioxide solution 62 emitted by the spray bar 60 completes, cleaning, descaling, and sanitizing of the apples 114. The dodecylbenzenesulfonic acid or sodium dodecylbenzene sulfonate in the Third Solution which is fed to the chlorine dioxide reactor 82 produces a slight bubbling of the solution 62 from the spray bar 60 which is helpful for indicating to an observer that a chlorine dioxide is present in solution 62. As the apples 114 pass over the rotating brushes 58, the apples 114 are tumbled by the brushes 58 so that chlorine dioxide solution 62 is emitted from the spray bar 60 onto all surfaces of the apples 114. Further, the frictional action of the brushes 58 on the apples 114 provides a mechanical agitation of the apples 114 which gently wipes debris and residue from the surface of the apples 114. After passing over the apples 114, the second chlorine dioxide solution 62 may pass to a drain (not shown) or be added to the process water 106 in the dump tank 12.

As the apples 114 continue on the apple conveyor 56, the apples 114 pass under the rinsing sprayer 90 which emits potable water onto the apples 114 to remove residual amounts of chlorine dioxide solution 62 from the surface of the apples 114. After the rinsing sprayer 90, the apples 114 enter drying station 92 where a fan 94 blows ambient temperature air over the surface of the apples 114. The apples 114 are dried sufficiently in the drying station 92 so that wax will adhere to the surfaces of the apples 114 during the next phase of processing.

After the apples 114 have been dried, the apples 114 continue on the apple conveyor 56 to the waxing station 96. As the apples 114 pass through the waxing station 96, the apples 114 are tumbled on rotating brushes 98 as an overhead spraying mechanisms 100 sprays wax onto the apples 114. The rotating brushes 98 spread the wax across the surface of the apples 114. After the waxing station 96, the apples 114 are moved into the final drying station 102 where heated air is blown across the surface of the apples 114 by fan 104 to completely dry the apples 114. After the apples 114 exit the final drying station 102, the apples 114 proceed to sorting and sizing stations (not shown) for final packing.

This invention provides a simple and effective method for cleaning, sanitizing, and descaling produce after harvest. The method of the present invention would be useful on many types of produce, such as pears, peaches, plums, apricots, oranges, grapefruit, lemons, limes, avocados, cantaloupe, honeydew, watermelon, zucchini, squash, carrots, potatoes, and cucumbers. In addition, the present invention provides a simple and effective method for cleaning and sanitizing of contaminated water or other contaminated objects submerged in water, such as apple bins.

In addition, the present invention provides a safe and effective method for the use of a chlorine dioxide solution by allowing for on site generation. According to the present invention, small amounts of chlorine dioxide solutions, including solutions with up to 50% active chlorine dioxide, can be generated on site as needed. Accordingly, the present invention provides environmental and safety benefits by eliminating the need for the shipment, storage, and handling of hazardous chlorine dioxide solutions.

The nature and substance of the instant invention as well as its objects and advantages will be more clearly understood by referring to the following specific examples.

EXAMPLE 1

Apples were rolled in moist orchard soil until they were covered with soil. Then, the apples were allowed to dry. Once dry, the apples were allowed to soak in a 5 ppm solution of chlorine dioxide produced from a reaction of one part of First Solution with one part of Second Solution. No direct brush action was applied. After one minute, an apple was removed from the chlorine dioxide solution. Based upon visual inspection of the apple, approximately 95% of the soil had been removed from the surface of the apple. After 30 minutes, another apple was removed from the chlorine dioxide solution. Based upon visual inspection of the apple, approximately 98% of the soil had been removed from the surface of the apple.

EXAMPLE 2

Three identical containers were obtained. Container #1 was filled with a chlorine dioxide solution having a concentration of chlorine dioxide at 5 ppm. The solution was obtained from a reaction of one part of First Solution with one part of Second Solution. Container #2 was filled with a chlorine dioxide solution having a chlorine dioxide concentration of 11 ppm. The solution was obtained from a reaction of one part of First Solution with one part of Second Solution. Container #3 was filled with deionized water. Mold was introduced into each of the containers. A first sample was taken from each of the three containers after five minutes. A second sample was taken from each of the three containers after 50 minutes. All samples were placed onto prepared mold growth media and allowed to incubate for three days. At the end of three days, the mold plates were observed. For the samples taken from the 5 ppm and 11 ppm chlorine dioxide solutions, the samples showed negative for mold growth. For the samples taken from the solution which contained no chlorine dioxide, the sample showed positive for mold growth.

EXAMPLE 3

Two identical one liter volumetric flasks were obtained. Flask #1 was filled with deionized water and Flask #2 was filled with an 8 ppm chlorine dioxide solution. The chlorine dioxide solution was obtained from a reaction of one part of First Solution with one part of Second Solution. Both flasks were spiked with precisely the same amount of o-phenylphenol. When tested, 7 ppm residual of o-phenylphenol was present in Flask #1. Flask #2 showed a mild visual reaction upon addition of the o-phenylphenol. When tested, 1 ppm residual of o-phenylphenol was present in Flask #2.

EXAMPLE 4

Two identical one liter volumetric flasks were obtained. Flask #1 was filled with deionized water and Flask #2 was filled with an 8 ppm chlorine dioxide solution. The chlorine dioxide solution was obtained from a reaction of one part of First Solution with one part of Second Solution. Both flasks were spiked with precisely the same amount of 1-hydroxyethylidene-1, 1-diphosphonic acid (HEDPA). When tested, 6 ppm residual of HEDPA was present in Flask #1. Flask #2 showed a mild visual reaction upon addition of the HEDPA. When tested, Flask #2 indicated that no HEDPA residual was present.

EXAMPLE 5

Two identical one liter volumetric flasks were obtained. Flask #1 was filled with deionized water and Flask #2 was filled with an 8 ppm chlorine dioxide solution. The chlorine dioxide solution was obtained from a reaction of one part of First Solution with one part of Second Solution. Both flasks were spiked with precisely the same amount of chlorophenol red (an organic dye). Flask #1 tested for positive for approximately 8 ppm chlorophenol red. Residual was determined visually by the presence of a reddish color. Flask #2 tested for virtually no chlorophenol red as determined by Flask #2 being absolutely colorless upon visual inspection.

While specific embodiments of the present invention have been shown and described in detail to illustrate the utilization of the inventive principles, it is to be understood that such showing and description have been offered only be way of example, and not by way of limitation. Protection by Letters Patent of this invention in all its aspects are set forth in the appended claims and is sought to the broadest extent that the prior art allows.

What is claimed is:

1. A method of treating produce that includes at least one contaminate from the group consisting of debris, soil, fungus and/or organic chemicals, said method comprising:

generating a chlorine dioxide solution by the reaction of a solution comprising sodium chlorite with a solution comprising phosphoric acid, sodium II-ethylhexyl sulfate, and either dodecylbenzenesulfonic acid or sodium dodecylbenzene sulfonate;

providing sprayers;

delivering said chlorine dioxide solution to the sprayers; and using said sprayers to spray the chlorine dioxide solution on said produce to wash said contaminate from the produce.

2. The method of claim 1, further comprising placing the produce onto a conveyor and using the conveyor to move the produce under the sprayers, and during movement using the sprayers to spray chlorine dioxide solution onto the produce.

3. The method of claim 2, further comprising a plurality of rinsing sprayers over the conveying path of the conveyor downstream of the sprayer that spray the chlorine dioxide solution on the produce, whereby the rinsing sprayers may be used to spray the produce with potable rinse water.

4. The method of claim 2, further comprising providing the conveyor with rotating brushes, and rotating said brushes while they are in contact with the produce, so that the brushes will brush the produce and mechanically remove debris and residue from the produce.

5. The method of claim 1, further comprising providing rotating brushes, and, placing the produce in contact with the rotating brushes, so that the brushes will brush the produce and mechanically remove debris and residue from the produce.

* * * * *

UNITED STATES PATENT AND TRADEMARK OFFICE
CERTIFICATE OF CORRECTION

PATENT NO. : 6,004,604
DATED : December 21, 1999
INVENTOR(S) : Thomas Iverson, Jr. et al.

It is certified that error appears in the above-identified patent and that said Letters Patent is hereby corrected as shown below:

On the cover, upper left-hand corner, "Thomas, Jr. et al" should be -- Iverson, Jr. et al. --.

Title should be -- Method For Treating Produce --.
Under [75] "Inventors:", "Iverson Thomas, Jr., Yakima; Prindle Joyce, Olympia; Keith E. Robert, Puyallup" should be -- Iverson, Thomas Jr., Yakim; Prindle, Joyce, Olympia; Keith, Robert E., Puyallup --.

On the cover under "[56] "References Cited, U.S. PATENT DOCUMENTS", "Suobuda et al." should be -- Svoboda et al. --.

On the cover under "[57] Abstract", the 2nd line down, "which can be" should be -- from the group consisting of --.

On the cover under "[57] Abstract", the 7th line from the bottom, "brushes that brush" should be -- brushes brush --.

Column 1,
Line 16, delete the period after "dioxide".
Lines 37 and 38, delete "process water and an object submerged in process water when the process water and the object include" and insert -- produce that includes --.
Line 54, "sprayers and may be" should be -- sprayers may be --.

Column 2,
Line 8, "is shematic view of produce cleaning assembly" should be -- is a schematic view of a produce cleaning assembly --.
Line 29, delete the period after "attached".

Column 3,
Line 17, "an overhead" should be -- overhead --.
Line 41, "invent the the" should be -- invention, the --.

UNITED STATES PATENT AND TRADEMARK OFFICE
CERTIFICATE OF CORRECTION

PATENT NO. : 6,004,604
DATED : December 21, 1999
INVENTOR(S) : Thomas Iverson, Jr. et al.

It is certified that error appears in the above-identified patent and that said Letters Patent is hereby corrected as shown below:

Column 6,
Line 39, delete the comma after "completes".

Column 7,
Line 2, "mechanisms" should be -- mechanism --.

Column 8,
Line 37, "tested for positive" should be -- tested positive --.
Line 46, "by" should be -- be --.

Column 9,
Line 5, "sprayer" should be -- sprayers --.

Signed and Sealed this

Twenty-first Day of August, 2001

*Attest:*

*Attesting Officer*

NICHOLAS P. GODICI
*Acting Director of the United States Patent and Trademark Office*